April 23, 1968 KOICHIRO MATSUNO 3,379,985

HIGH FREQUENCY MAGNETIC AMPLIFIER EMPLOYING ATTRACTIVE EXCHANGE INTERACTION BETWEEN SPIN WAVES

Filed Nov. 7, 1966

INVENTOR.
KOICHIRO MATSUNO

BY

Hopgood & Calimafde
ATTORNEYS.

United States Patent Office 3,379,985

Patented Apr. 23, 1968

3,379,985

HIGH FREQUENCY MAGNETIC AMPLIFIER EMPLOYING "ATTRACTIVE EXCHANGE INTERACTION" BETWEEN SPIN WAVES

Koichiro Matsuno, Tokyo, Japan, assignor to Nippon Electric Company Limited, Tokyo, Japan, a corporation of Japan Filed Nov. 7, 1966, Ser. No. 592,536

Claims priority, application Japan, Feb. 9, 1966, 41/7,604

7 Claims. (Cl. 330—4)

ABSTRACT OF THE DISCLOSURE

A microwave amplifier including a plate of ferrimagnetic material or antiferromagnetic material in a waveguide, and means for supplying to the plate both a pumping wave and the signal wave to be amplified after subjecting the waves to mutually inverse rotation of their respective magnetic field components, whereby amplification is achieved through energy transfer from the pumping wave to the signal wave by means of the principle of attractive exchange interaction between spin waves.

Figure 1:
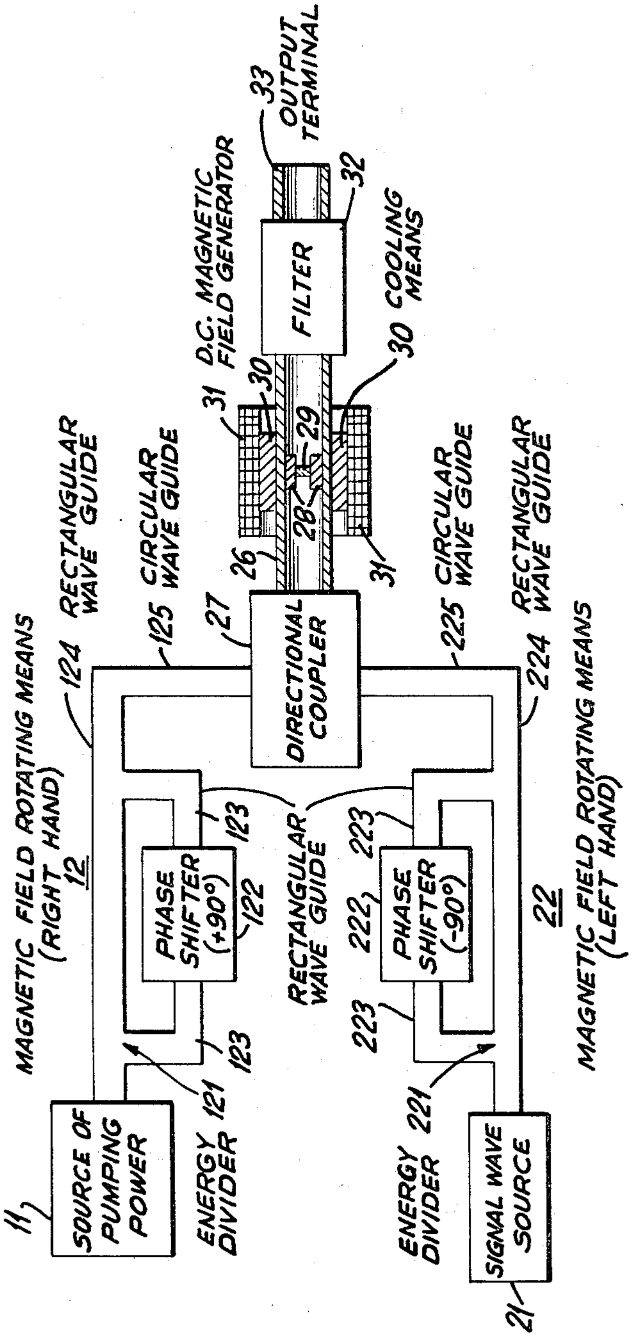

This invention relates to a high frequency amplifier device employing magnetic material and, more particularly, to a microwave amplifier device in which antiferromagnetic material or ferrimagnetic material is used as an amplifying element.

A parametric amplifier employing a ferromognetic material has heretofore been proposed as an amplifier device. The detailed explanation of this amplifier device will be omitted here because its mechanism and performance are described and theoretically explained in an article by H. Suhl, disclosed on pages 1225 to 1236 of the "Journal of Applied Physics," vol. 28, No. 11 (November 1957), and also in an article by R. T. Denton, disclosed on pages 300s to 307s of the "Journal of Applied Physics," Supplement to vol. 32, No. 3 (March 1961). However, to briefly describe the device of the kind just referred to, it comprises, as its principal constituent elements, a plate of ferromagnetic material inserted in a wave guide and positioned perpendicularly to the direction of transmission of the applied electromagnetic wave, and a direct-current magnetic field generating device for magnetizing said plate in parallel with the plane thereof. Said wave guide, said ferromagnetic material plate, and said direct-current magnetic field generating device are so positioned with respect to each other that the direction of the magneic field or the direction of the electric field within the wave guide may coincide with the direction of the atomic magnetic moments (which will sometimes be referred to as "spin" hereinafter), which are forcibly oriented in the direction of said direct current field, and consequently contribute to the macroscopic magnetization of said plate. As is understood from the above-mentioned article by R. T. Denton, the spin excitation in the amplifier device of the kind referred to is performed by a pumping wave having a magnetic field which is either parallel or perpendicular, within the plane of said ferromagnetic material plate, to the direction of the direct current field or of the forcibly oriented spins and which is made parallel to the direction of the magnetic field of a high frequency signal to be amplified. In the above-mentioned article by R. T. Denton, the pumping by the pumping wave having the magnetic field perpendicular to the direction of the spin is defined as the transverse pumping, whereas the pumping by the pumping wave having the magnetic field parallel to the direction of the spin is defined as the longitudinal pumping, and it is pointed out that the longitudinal pumping needs less pumping power than the transverse pumping. The spins forcibly oriented in the direction of the direct-current magnetic field by said magnetic field device absorb the energy of the pumping wave from the excitation thereof effected by the magnetic field of the pumping wave and thereafter transfer the absorbed energy to the signal wave to be amplified through the coupling with the magnetic field of the signal wave.

As is understood from the articles by R. T. Denton and by H. Suhl, however, the above-mentioned parametric amplifier device possesses such defects that the frequency of the signal to be amplified cannot be made sufficiently high. This is due to the fact that a power source of sufficiently high frequency and of sufficiently great power is not available as the pumping wave source for such an amplifier device, it being understood that the frequency of the pumping wave source must inherently be higher than the frequency of the signal to be amplified. Moreover, there is another disadvantage in that the amplifier device as a whole becomes complicated and occupies a large space, especially because it embodies an idler circuit tuned to the difference frequency between the pumping wave frequency and the input signal frequency and the idler circuit is indispensable to the construction and operation of the composite amplifier device.

Therefore, the object of the present invention is to provide a microwave amplifier device which obviates the above-mentioned defects of the amplifier device of the prior art, and which does not need any particular circuit such as the idler circuit and is perfectly free from any significant restriction as to the choice of the frequency relation between the pumping wave and the signal wave.

The amplifier device of the invention comprises, as the principal constituent elements: a plate of antiferromagnetic material, such as manganese sulfide MnS, or ferrimagnetic material, such as yittrium iron garnet (YIG), inserted in a wave guide in the same manner as the ferromagnetic material plate of the above-mentioned prior device; a direct-current magnetic field generating means for magnetizing said plate perpendicularly to the plane of said magnetic material plate and consequently in parallel to the transmission direction of the electromagnetic waves within the wave guide; and means for supplying to said plate both the signal wave to be amplified and the pumping wave after subjecting said waves to mutually inverse rotation of their respective magnetic field components: whereby each of the spins forcibly oriented in the direction of the direct-current magnetic field is excited by said high frequency magnetic fields rotated in the mutually inverted directions.

It is well known that, as to the antiferromagnetic material, the apparent macroscopic magnetization does not appear or become evident, because the construction of the spin system contributing to the internal magnetization of such magnetic material takes the form that the nearest neighbor spins are oriented or excited in antiparallel alignment with each other to establish the most stable energy state. Therefore, by resorting to an attractive exchange interaction between two groups of the excited spins, one of which is forcibly oriented or excited in one direction by the rotating magnetic field of the pumping wave, and the other is forcibly oriented or excited in a direction opposite to the direction of orientation or excitation by the rotating magnetic field of the signal wave, then the desired amplifying action can be obtained through the energy transfer from the pumping wave to the signal wave. The attractive exchange interaction of spins is explained as to superconductivity phenomena in an article by J. Bardeen et al., disclosed on pages 1175 to 1204 of "Physical Review," vol. 108 (1957). Inasmuch as the low-lying energy states of spin systems coupled by such exchange interactions are wave-like, the waves are called spin waves, as to which reference is made on page 49 of a publication entitled "Quantum Theory of Solids," by C. Kittel. According to this terminology, the amplifier device of the present invention may be called a microwave amplifier device employing an attractive exchange interaction between the spin waves. In other words, this invention is based on a discovery that an attractive exchange interaction between spin waves can be utilized for amplifying a microwave. Spin wave excitation by a high frequency rotating magnetic field is theoretically analyzed in an article by R. Kubo, disclosed on pages 570 to 586 of "Journal of Physical Society of Japan," vol. 12, No. 6 (June, 1957), whereas a theoretical analysis of the exchange interaction between spin waves in an antiferromagnetic material is treated in an article by J. Szaniecki, disclosed on pages 1357 to 1387 of "Physica," vol. 31 (1965).

The amplifier device of this invention does not possess the defects above referred to which were evident in the amplifying equipment heretofore disclosed. The magnetic materials and the properties of magnetic materials used in the amplifying arrangement of this invention are different from the earlier disclosed device as will be apparent from the description hereinafter following; the aparatus for, and the manner of, the spin excitation are entirely different.

More specifically, according to this invention, a microwave amplifier device is provided, in which the frequency or frequencies of the pumping wave source and the frequency or frequencies of the signal or of the source of signal waves are arbitrarily chosen and do not bear predetermined relationships to each other. Furthermore, the arrangement of this invention does not require any additional circuit element such as the idler circuit for its operation.

Figure 2:
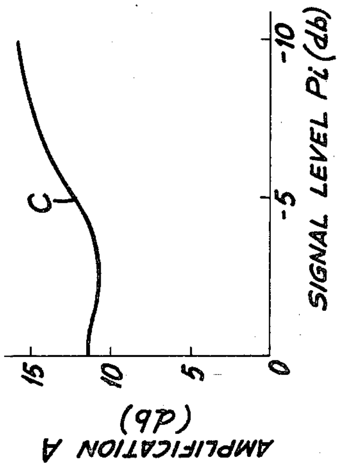

This invention will be better understood from the more detailed description hereinafter following when read in connection with the accompanying drawing, in which:

FIG. 1 shows schematically, partly in blocks, a longitudinal sectional view of an embodiment of this invention; and FIG. 2 shows a performance characteristic of an embodiment of this invention.

Referring to FIG. 1 of the drawing, the amplifier device of an embodiment of the present invention generally comprises: a pumping power source 11; a magnetic field rotating means 12 for inducing in the pumping wave supplied from said power source 11 a rotating magnetic field component of a right-hand screw direction; another and complementary magnetic rotating means 22 for similarly inducing in the signal wave or waves supplied from a microwave signal source 21 a rotating magnetic field component of a left-hand screw direction; a directional coupler 27 for applying the pumping wave and the signal wave or waves, which are supplied from the magnetic field rotating means 12 and 22, respectively, to a circular waveguide 26; a single crystal plate 29 which may be, for example, of antiferromagnetic manganese oxide MnO, and which is positioned within said wave guide 26 by means of a supporter or supporters 28 formed of foamed polyethylene; a cooling means 30 surrounding said magnetic plate 29 so as to keep plate 29 below the Neel temperature; a direct-current magnetic field generating means 31 covering the outside of said cooling means 30 for applying a direct-current magnetic field to said magnetic material plate 29, in a direction parallel to the waveguide 26 axis; a band pass filter 32 for admitting and passing therethrough only the amplified signals; and an output terminal 33 for the amplified signal waves.

The magnetic field rotating equipment 12 comprises: any well-known dividing means 121 for dividing the energy of the pumping wave supplied from the pumping power source 11 into two component portions of substantially equal power; a rectangular waveguide 123 having interposed in the intermediary section thereof any well-known phase shifter 122 for advancing the phase of the magnetic field vector of one of the outputs from said dividing means 121 by approximately 90 degrees for application to the input of said directional coupler 27; another rectangular waveguide 124 for guiding the other of the outputs of the pumping wave separated by said dividing means 121; and a circular waveguide 125 for supplying the pumping waves from these rectangular waveguides 123 and 124 to the directional coupler 27. The rectangular waveguides 123 and 124 (adjacent to the pumping source 11) are coupled to the dividing means 121 so that the respective longer sides of their cross sections are perpendicular to each other. Hence, the divided component portions of the waves of the pumping source 11 will have magnetic field components which are perpendicular to each other. However, because a 90-degree phase difference between these two portions is introduced by the phase shifter 122, the rotating magnetic field of a right-hand screw direction will be produced at the circular waveguide 125.

Similarly, the magnetic field rotating equipment 22 comprises: a dividing means 221 for dividing the energy energy of the signal waves received from the input source 21 into two outputs of substantially equal power; a rectangular waveguide 223 having interposed in an intermediary segment thereof a phase shifter 222 for delaying the phase of the magnetic field vector of one of the outputs from said dividing means 221 by approximately 90 degrees so that such signal output will reach the input of the directional coupler 27 retarded by about 90 degrees; another rectangular waveguide 224 for guiding the other of the signal outputs of said dividing means 221; and a circular waveguide 225 for supplying the signal waves from both waveguides 223 and 224 to the directional coupler 27. Inasmuch as the physical and electrical relations between the circular waveguide 225 and the rectangular waveguides 223 and 224 of the magnetic field rotating means 22 are identical to relations established by the above-mentioned magnetic field rotating means 12, and as the direction of 90-degree phase shift in the means 22 is opposite to that effected by the means 12, the signal waves will be subjected to the magnetic field rotation of the left-hand screw direction.

The pumping wave or waves, and the signal wave or waves, in which magnetic-field rotations of a right-hand screw direction and of a left-hand screw direction are respectively induced by the magnetic field rotating means 12 and 22 in the above-mentioned manner, are guided to the common waveguide 26 through the directional coupler 27 and then applied to the magnetic plate 29.

Inasmuch as the spins in the magnetic plate 29 are forcibly oriented to the axial direction of the waveguide 26 in response to the equipment of this invention, such spins become respectively excited both by the rotating magnetic field of the right-hand screw direction of the pumping waves and by the rotating magnetic field of the left-hand screw direction of the signal waves. Accordingly, on account of the above-mentioned attractive exchange interaction between the spin waves excited by the rotating magnetic fields of the signal waves and the pumping wave, respectively, the spin system as a whole induces a transition and an interaction so as to raise the energy level of the spin waves corresponding to the signal waves. More particularly, inasmuch as the pumping wave power can be made sufficiently greater than the signal wave power, and as the energy to be transferred to the signal waves is successively supplied from the pumping power source, the energy of the spin waves excited by the rotating magnetic field of the pumping waves is transferred to the spin waves excited by the rotating magnetic field of the signal waves during the transition of the spin system as a whole to the lower stable state. This results in a very substantial energy intensification of the signal waves and, accordingly, such signal waves become amplified.

The amplified signal waves are separated from the pumping waves by the filter 32 and may be removed from the output terminal 33 and, if desired, transmitted to any desired load or operating equipment.

The range of frequencies that can be amplified by this amplifier device can be adjusted to the range of frequencies of the signal waves to be amplified merely by varying the magnetic field generated by the magnetic field equipment 31. This adjustability arises from the fact that the spin resonance frequency can be varied by varying the intensity of the above-mentioned direct-current magnetic field, as will be understood by those skilled in the art who are familiar with the properties of ferromagnetic resonance absorption phenomena. Also, the frequency range of this amplifier device can be further varied by suitably setting the ambient temperature of the magnetic material 29. The spin resonance frequency will be lowered to the saturation magnetization point when the temperature of magnetic material 29 is raised to the vicinity of the Neel temperature, as will be understood by those skilled in the art who are familiar with the theory of mechanism for the magnetization of ferromagnetic material. Needless to say, however, the upper limits of the frequencies of the signal waves and the upper limit of the frequency of the pumping waves are determined by the inherent cut-off frequencies of the waveguides 123, 124, 223, 224 and 26 arising from the physical dimensions of such waveguides.

The transition time *dt* required for the transition of the energy state of the spin wave in the magnetic plate 29 is given from the uncertainty principle, as follows:

$$dt=\bar{h}/dE$$

where $\bar{h}$ represent the Planck constant divided by $2\pi$, and $d$E represents the energy difference between the excited state and the ground state of the spin system. Therefore, in order to fully utilize this entry difference in the practice of this invention, the thickness of the magnetic plate 29 must be chosen so that the transmission time $dt_0$ required for the pumping wave and the signal wave to transmit through the magnetic plate 29, is as long as, and is preferably longer than, the above-mentioned time *dt* as determined from the above equation. This thickness can be calculated when the pumping power is given. On the other hand, in a magnetic plate kept at a finite temperature (but not the absolute zero temperature), the thermal equilibrium is reached as a result of the energy relaxation caused by the interaction of the spin wave excited by the external high frequency electromagnetic field with other spin waves or by the collision of said spin wave with the crystal lattice. Taking into account the known value, approximately $10^{-5}$ seconds, of the time $dt'$, which is required for thermal equilibrium to be reached (as suggested by an article by A. E. Akhzier et al. disclosed in "Soviet Physics Journal of Experimental and Theoretical Physics," vol. 9, referred to), the time $dt_0$ must be short as, or shorter than, the time $dt'$.

Referring to FIG. 2 of the drawing, the signal input power $P_1$ obtained with the apparatus of this invention is represented by the abscissae in decibels and the signal amplification factor A is represented by the ordinates also in decibels. It will be seen that the almost flat amplification characteristic C can be obtained over a considerably wide range of the signal input power level.

Details of an experimental device from which this characteristic was obtained are as follows:

Signal wave source 21: a klystron (oscillation frequency 50,000 mHz.);

Pumping wave source 11: a magnetron (oscillation frequency 35,000 mHz.);

Magnetic plate 29: a single crystal disc of maganese oxide MnO; the diameter and the thickness of the disc are 3 mm. and 1 mm., respectively; the disc is maintained at a temperature a few degrees lower than its Neel temperature 120° K. by the cooling means 30;

Magnetic field equipment 31: a solenoid which produces a magnetic field of 10,000 gauss over the whole surface of the magnetic plate 29.

The above-described construction of the magnetic field rotating means 12 and 22, as shown in FIG. 1, was adopted so as to avoid any substantial power loss of the pumping waves and of the signal waves. However, if a power loss is tolerable in the system to be used, the arrangement may be modified if desired so that only one of the field rotating means 12 or 22 is employed. In that case only the selected field rotating means, 12 or 22, will be used to obtain a right-hand or a left-hand screw direction rotating magnetic field which will be arranged to act on the pumping waves or the signal waves.

It will be understood, moreover, that any ferromagnetic material, such as yttrium iron garnet (YIG), having a similar construction of its spin system, as well as any antiferromagnetic material, such as manganese sulfide MnS or dichromium trioxide $Cr_2O_3$, may be used for the magnetic plate 29 in the practice of this invention. An antiferromagnetic material, manganese oxide MnO, was used, as already noted, in the above-mentioned amplifier device in the arrangement for which the curve of FIG. 2 was obtained.

Furthermore, if a magnetic material used for the component 29 has a sufficiently high Curie temperature, the cooling equipment 30 may be dispensed with.

Still furthermore, it will be understood that the directional coupler 27 may be replaced with any arbitrary irreversible transmission means for guiding the electromagnetic wave supplied by the two input sources, the pumping source 11 and the signal source 21, to a single output circuit. If the circular waveguides 125 and 225 are respectively replaced by unidirectional waveguides or isolators, the unidirectional coupler 27 may be dispensed with.

While this invention has been shown and described in certain particular arrangements merely for the purpose of illustration, it will be understood that the general principles and features of this invention may be applied to other and widely varied organizations without departing from the spirit of the invention and the scope of the appended claims.

What is claimed is:

1. An amplifier device for amplifying a signal wave comprising: a magnetic element of magnetic material having the nearest neighbor spins substantially in antiparallel relationship to exhibit no appreciable apparent macroscopic magnetization; a direct-current magnetic field generating means for applying to said magnetic element a direct-current magnetic field in the direction of said spins; a first magnetic field rotating means for inducing in the magnetic field component of a high frequency electromagnetic signal wave to be amplified a rotation of a predetermined direction; a second magnetic field rotating means for inducing in the magnetic field component of a pumping electromagnetic wave a rotation of another direction opposite to said predetermined direction; means for guiding said signal wave and said pumping wave respectively supplied from said first and second magnetic field rotating means to said magnetic element, the electric field vectors and the magnetic field vectors of both the waves being kept perpendicular to the uniformly arranged direction of said spins so that said spins may be excited by said signal wave and said pumping wave; and a filter for discriminating the signal wave amplified by absorbing the energy of the pumping wave through the attractive exchange interaction between the excited spins within said magnetic element.

2. An amplifier for amplifying a band of signals comprising: a pumping power wave source having a frequency different from the frequencies of the band of signals to be amplified; a waveguide of predetermined cross section; a ferrimagnetic or antiferromagnetic element positioned in said waveguide so that an axis in the plane thereof is generally perpendicular to the longitudinal dimension of the waveguide; a generator of a D.C. magnetic field positioned in the vicinity of said magnetic element and producing a magnetic field parallel to the longitudinal dimension of said waveguide; a phase-shifter for rotating the pumping power wave by a predetermined angle with respect to the signals to be amplified; a coupler for applying to the magnetic element the signals to be amplified from a second waveguide and the pumping power wave from a third waveguide after it has been rotated by said predetermined angle; and a filter for eliminating the pumping power wave and transmitting the signals after the signals have been amplified.

3. A claim according to claim 2 in which the magnetic element is made of manganese oxide MnO.

4. A claim according to claim 2 in which the magnetic element is made of yttrium iron garnet (YIG).

5. A claim according to claim 2 including cooling elements for maintaining the magnetic element below a predetermined temperature.

6. An amplifier for amplifying a band of signals comprising: a waveguide of circular cross section; a ferrimagnetic or antiferromagnetic plate positioned within the waveguide so that the plate is perpendicular to the longitudinal dimension of the waveguide; an emitting current of pumping power wave source having a predetermined frequency; a phase-shifting arrangement for rotating the pumping power wave by a predetermined angle in one direction and for rotating the band of signals to be amplified by said predetermined angle in the opposite direction; a directional coupler for transmitting the pumping power wave and the band of signals to the waveguide after the pumping power wave and the band of signals have undergone said opposite rotations so as to apply such currents to the magnetic plate; a source of a D.C. magnetic field for creating within the waveguide a magnetization in a direction along the longitudinal dimension of the waveguide, the strength of the magnetization of the D.C. magnetic field being adjusted to cause the pumping power wave to act on all frequencies of the signal band to be amplified; and a band pass filter at the output of the waveguide for eliminating the wave corresponding to the source of pumping power.

7. A claim according to claim 6 in which the magnetic material is made of manganese oxide MnO which is maintained at a temperature below a predetermined temperature.

References Cited

UNITED STATES PATENTS

| | | | |
|---|---|---|---|
| 2,825,765 | 3/1958 | Marie | 330—5 |
| 3,014,184 | 12/1961 | Berk et al. | 330—4.8 |
| 3,258,703 | 6/1966 | Moore | 330—4.8 |

ROY LAKE, *Primary Examiner.*

D. R. HOSTETTER, *Assistant Examiner.*